United States Patent [19]

Amano et al.

[11] Patent Number: 5,071,234

[45] Date of Patent: Dec. 10, 1991

[54] POLARIZATION FILM

[75] Inventors: Jiro Amano, Osaka; Syunroku Toyama, Shiga, both of Japan

[73] Assignee: Toray Industries, Inc., Nihonbashi-Muromachi, Japan

[21] Appl. No.: 448,656

[22] Filed: Dec. 6, 1989

Related U.S. Application Data

Continuation of PCT/JP89/00237, Mar. 6, 1989.

[30] Foreign Application Priority Data

| Mar. 8, 1988 [JP] | Japan | 63-54657 |
| Mar. 8, 1988 [JP] | Japan | 63-54658 |

[51] Int. Cl.$^5$ ............................................. G02B 5/30
[52] U.S. Cl. ............................................ 359/490; 359/483
[58] Field of Search ............. 350/374, 403, 398, 399, 350/370, 397, 337; 528/26

[56] References Cited

U.S. PATENT DOCUMENTS

| 4,133,775 | 1/1979 | Bloom | 350/398 |
| 4,388,375 | 6/1983 | Hopper et al. | 350/397 |
| 4,643,529 | 2/1987 | Hosonuma et al. | 350/337 |
| 4,923,948 | 5/1990 | Matsuki et al. | 528/26 |
| 5,004,327 | 4/1991 | Rosen | 350/398 |
| 5,007,942 | 4/1991 | Claussen et al. | 350/398 |

FOREIGN PATENT DOCUMENTS

| 56-48601 | 5/1981 | Japan. |
| 61-43703 | 3/1986 | Japan. |
| 62-240905 | 10/1987 | Japan. |

*Primary Examiner*—Bruce Y. Arnold
*Assistant Examiner*—James Phan
*Attorney, Agent, or Firm*—Fish & Richardson

[57] ABSTRACT

A polarization film which has excellent polarizing ability and resistance to moisture and heat is described. The polarization film includes an oriented polyvinyl-alcohol-type film having iodine adsorbed thereon, and contains a zirconium compound or a manganese compound. The zirconium compound or the manganese compound is thought to prevent dissociation of a polyiodide ion such as $I_3^-$ or $I_5^-$ capable of providing the polarizing ability. The polarization film of the invention may be suitable for use in a variety of liquid crystal displays, including those which are used in severe environments, such as automotive display devices, and in ordinary household devices, for example word processors.

5 Claims, No Drawings

POLARIZATION FILM

This application is a continuation under 35 USC §120 and §365(c) of U.S. international application PCT/JP89/00237, filed Mar. 6, 1989, now abandoned.

FIELD OF THE INVENTION

Our invention relates to a polyvinyl-alcohol-type polarization film which is superior both in its light polarizing ability and resistance to moisture and heat. The polarization film has iodine adsorbed and oriented thereon, and contains a zirconium compound or a manganese compound. The zirconium compound is preferably at least one of a zirconium halide, oxizirconium halide, inorganic zirconium salt or a hydrolyzate of a zirconium salt.

BACKGROUND OF THE INVENTION

In recent years, there has been an increasing demand for polarization films partly because of spreading use of liquid crystal display (LCD) devices in various apparatus, such as word processors, personal computers and liquid crystal televisions, and partly because of a trend for greater display areas of LCD devices. Hitherto, polyvinyl-alcohol-type (PVA-type) polarization films have been used in liquid crystal display devices. However, improvements are required to attain higher polarization performance and durability.

PVA-type polarization films are generally categorized into the following types: (1) an iodine-type film in which iodine is adsorbed and oriented on a film material, (2) a dye-type film in which a dichroic dye is adsorbed and oriented on a film material, and (3) a polyene-type film obtained by partly dehydrating a film material.

Among these polarization films, the iodine-type film is typically used because it is superior in its polarization performance as compared with other types of polarization film. Unfortunately, however, the iodine-type polarization film is not resistant to moisture and heat.

In order to overcome this problem, Japanese Kokai No. 56-48601 proposed a method in which a film having iodine adsorbed and oriented thereon is impregnated with cobalt ions. Japanese Kokai No. 62-18030 proposed a method in which a film having iodine adsorbed and oriented thereon is impregnated with nickel ions. These proposals, however, have failed to improve resistance to moisture and heat to an appreciable level, so that the iodine-type film can have only limited use due to inferior humidity and heat resistance despite its superior polarization performance.

SUMMARY OF THE INVENTION

Accordingly, an object of this invention is to provide a polarization film which simultaneously satisfies both demands for superior polarization ability and high resistance to moisture and heat.

The invention provides a PVA-type polarization film having iodine adsorbed and oriented thereon, wherein the film contains a zirconium compound or a manganese compound.

The zirconium compound of a film in accordance with the invention may be a zirconium salt of a hydrolyzate thereof. The zirconium content of the film preferably is from 0.1 to 50 milligrams per gram of PVA-type film. The manganese compound of a film according to this invention is preferably a manganese salt. Preferably, the manganese content is 0.05 to 50 milligrams per gram of PVA-type film.

DESCRIPTION OF PREFERRED EMBODIMENTS

Examples of the PVA-type films used in the present invention are a polyvinyl alcohol film, a polyvinyl formal film, a polyvinyl acetal film, a poly(ethylene-vinyl acetate)copolymer saponification film, and a PVA-derivative film such as a partially polyenated PVA film.

Known processes can be used for allowing iodine to be adsorbed and oriented on a PVA-type film, such as a method in which a non-drawn PVA-type film is immersed in an aqueous solution of iodine and potassium iodide followed by uniaxial drawing, or a method in which uniaxially-drawn PVA-type film is immersed in an aqueous solution of iodine and potassium iodide.

Impregnation of such a PVA-type film with a zirconium compound or a manganese compound can be effected by any of the ordinary impregnation processes. For example, a process in which the zirconium compound or the manganese compound is added to an aqueous solution of PVA-type film cast-forming resin, a process in which the zirconium compound or the manganese compound is added to an aqueous solution of iodine and potassium iodide so as to enable the film to contain the zirconium compound or the manganese compound simultaneously with the adsorption of iodine, a process in which undrawn film with iodine adsorbed thereon draws an aqueous solution containing boric acid, potassium iodide and the zirconium compound or the manganese compound, and a process in which a drawn film on which iodine has been adsorbed and oriented is immersed in an aqueous solution containing boric acid, potassium iodide and the zirconium compound or the manganese compound, are usable in the present invention. Thus, adsorption, orientation and fixing (cross-linking of PVA and another component) are conducted in most cases in aqueous solutions. The last two processes mentioned above, in which the zirconium compound or the manganese compound is added in the final step, are preferably used.

The zirconium compound used in the present invention is preferably a zirconium salt or a hydrolyzate thereof. For example, a halide of zirconium such as zirconium chloride, zirconium bromide or zirconium iodide, an oxihalide of zirconium, a zirconium sulfate, a zirconium nitrate or a hydrolyzate of one of such substances can be used suitably as the zirconium compound. Thus, the zirconium compound contained in the PVA-type film exists in the form of zirconium ions or oxi-zirconium ions.

The zirconium content in the polarization film preferably ranges between 0.1 and 50 mg per gram of PVA-type film, more preferably between 0.5 and 20 mg per gram of PVA-type film.

The manganese compound used in the present invention is preferably a manganese salt. Examples of suitable manganese salts are a halide of manganese such as manganese chloride, manganese bromide and manganese iodide, a manganese acetate, a manganese sulfate, a manganese nitrate, and the like.

The manganese content in the polarization film preferably ranges between 0.05 and 50 mg per gram of PVA-type film, more preferably between 0.5 and 20 mg per gram of PVA-type film.

The mechanism of the effect produced by a zirconium compound or a manganese compound in a film according to our invention has not been clarified. However, as a result of an intense study of the iodine-type PVA film which is inferior in moisture and heat resistance, we have found that polyiodine ions $I_3^-$ and $I_5^-$ which exhibit absorption in the visible light region to develop the polarization performance are dissociated into transparent $I^-$ which has no absorption in the visible light region, when the iodine-type PVA film is treated at high moisture and temperature conditions. Thus, we have found that the iodine density in the film is never reduced even after the film has been made transparent to lose the polarization performance as a result of a treatment at high humidity and temperature conditions. It is conceivable that the zirconium compound or the manganese compound can form a chelate with PVA and polyiodine ions through many coordinate bondings. It is also conceivable that the zirconium compound or the manganese compound inhibits the dissociation equilibrium of the polyiodine ions. In any event, the inventive film achieves improved resistance to moisture and heat via a zirconium compound or a manganese compound, regardless of the precise mechanism explaining such an effect.

The polarization film of the present invention is superior in optical characteristics (transmittance and polarization efficiency), as well as in resistance to moisture and heat. Therefore, the polarization film according to the invention can enjoy wide use, including applications in devices which are used under severe conditions and applications in ordinary household devices such as word processors. For example, applications of our invention may include various optical instruments and devices, sunglasses, automobile windshields, windows of buildings, and so forth.

Furthermore, the polarization film of the present invention is expected to find further use in other growing applications, such as in liquid crystal display devices on instrument panels of automobiles.

EXAMPLES

Examples of the polarization film of the invention are shown below together with comparison examples.

Measurement of transmittance of the following Examples and Comparison Examples were conducted with a spectrophotometer (U-3400 manufactured by Hitachi, Ltd.). Y represents transmittance of a single film, $Y_1$ represents parallel transmittance of two layers of the films superposed with their molecular orientation directions parallel to each other, and $Y_2$ represents orthogonal transmittance of two layers of the films superposed with their molecular orientation directions set orthogonal to each other. Y, $Y_1$ and $Y_2$ were measured and mean values of the respective transmittance over the visible light region of 400 to 700 nm were obtained.

The polarization efficiency was determined in accordance with the following formula:

$$\text{polarization efficiency, } V(\%) = \sqrt{\frac{Y_1 - Y_2}{Y_1 + Y_2}} \times 100$$

EXAMPLE 1

A PVA film was uniaxially drawn at a ratio of 4.5 at 130° C., and was laminated with a cellulose triacetate (CTA) film so that a single-side laminated PVA film (referred to as semi-laminated film) was obtained.

The semi-laminated film was immersed for 15 seconds in an aqueous solution at 35° C. containing 0.3 wt. % of iodine and 5 wt. % potassium iodide (iodine adsorption bath). After a subsequent rinsing, the semi-laminated film was immersed for 30 seconds in an aqueous solution at 75° C. containing 4 wt. % of boric acid. 10 wt. % of potassium iodide and 8 wt. % of zirconium chloride (fixing bath) followed by rinsing and drying.

Then, a one-minute heat treatment was effected at 150° C on the semi-laminated film in a tensed state, whereby a polarization film in which the PVA side is laminated with CTA film was obtained having a zirconium content of approximately 13 mg/g of PVA film.

The initial optical performance of this film as well as performance after a moisture and heat treatment (75° C, 90% Relative Humidity, 8 hours) are shown in the Table.

EXAMPLE 2

A polarization film (zirconium content approximately 15 mg/g of PVA film) was obtained through the same process as in Example 1, except that the zirconium chloride of the fixing bath was replaced with 5 wt. % of oxi-zirconium chloride and the temperature of the fixing bath was changed to 70° C.

The initial performance of this film and the performance after a moisture and heat treatment (75° C, 90% RH, 8 hours) are shown in the Table.

EXAMPLE 3

A polarization film (manganese content approximately 15 mg/g of PVA film) was obtained through the process according to Example 2, except that the oxi-zirconium chloride was replaced with 5 wt. % of manganese chloride.

The initial performance of this film as well a performance after a moisture and heat treatment (75° C., 90% RH, 8 hours) are shown in the Table.

EXAMPLE 4

A polarization film (manganese content approximately 12 mg/g of PVA film) was obtained following the process of Example 3, except the content of the potassium iodide was changed to 10 wt. % in each of the iodide adsorption bath and the fixing bath.

The initial performance of this film and performance after a moisture and heat treatment (75° C., 90% RH, 8 hours) are shown in the Table.

COMPARISON EXAMPLE 1

A polarization film was prepared by the same process as in Example 1, except that the fixing bath did not contain zirconium chloride.

COMPARISON EXAMPLE 2

A polarization film was prepared by the process of Example 2, except that the oxi-zirconium chloride of the fixing bath was replaced with 5 wt. % of cobalt chloride.

COMPARISON EXAMPLE 3

A polarization film was prepared according to the process of Example 2, except that the oxi-zirconium chloride of the fixing bath was replaced with 5 wt. % of nickel chloride.

TABLE

| Tested polarization films | Initial Performance | | Performance after treatment (8 hours at 75° C. and 90% RH) | |
|---|---|---|---|---|
| | Transmittance Y (%) | Polarization efficiency V (%) | ΔY (%) | ΔV (%) |
| Example 1 | 40.6 | 99.3 | 1.3 | 1.9 |
| Example 2 | 41.3 | 98.9 | 2.5 | 1.0 |
| Example 3 | 39.6 | 99.1 | 1.6 | 2.9 |
| Example 4 | 41.2 | 98.3 | 0.5 | 1.1 |
| Comparison Example 1 | 32.7 | 96.3 | 11.0 | 6.2 |
| Comparison Example 2 | 41.0 | 99.2 | 4.1 | 13.7 |
| Comparison Example 3 | 39.4 | 98.9 | 9.3 | 19.0 |

ΔY: Change in Transmittance by moisture and heat treatment (8 hours at 75° C. and 90% Relative Humidity)
ΔV: Change in Polarization efficiency by moisture and heat treatment (8 hours at 75° C. and 90% RH)

What is claimed is:

1. A polarization film consisting essentially of a polyvinyl-alcohol-type film having iodine oriented thereon and a zirconium or manganese compound contained within the polyvinyl-alcohol-type film.

2. A polarization film according to claim 1, wherein said zirconium compound is a zirconium salt or a hydrolyzate of a zirconium salt.

3. A polarization film according to claim 1, wherein said polyvinyl-alcohol-type film has a zirconium content of 0.1 to 50 mg per gram of said polyvinyl-alcohol-type film.

4. A polarization film according to claim 1, wherein said manganese compound is a manganese salt.

5. A polarization film according to claim 1, wherein said polyvinyl-alcohol-type film has a manganese content of 0.05 to 50 mg per gram of said polyvinyl-alcohol-type film.

* * * * *